United States Patent

Komatsu et al.

[11] Patent Number: 4,681,251
[45] Date of Patent: Jul. 21, 1987

[54] METHOD OF JOINING NI-BASE HEAT RESISTING ALLOYS

[75] Inventors: Shuichi Komatsu, Yokohama; Kazumi Shimotori, Kawasaki; Hiromitsu Takeda, Tokyo; Masako Nakahashi, Kawasaki, all of Japan

[73] Assignee: Tokyo Shibaura Denki Kabushiki Kaisha, Kawasaki, Japan

[21] Appl. No.: 782,163

[22] Filed: Oct. 2, 1985

Related U.S. Application Data

[63] Continuation of Ser. No. 386,031, Jun. 7, 1982.

[30] Foreign Application Priority Data

Jun. 9, 1981 [JP] Japan .................................. 56-87429
Jun. 9, 1981 [JP] Japan .................................. 56-87430

[51] Int. Cl.$^4$ ......................... B23K 1/04; B23K 20/24
[52] U.S. Cl. ..................................... 228/208; 228/194
[58] Field of Search ............... 228/116, 205, 207, 208, 228/203, 263.13, 194; 204/192 R

[56] References Cited

U.S. PATENT DOCUMENTS 3,466,737  9/1969  Hanink .................................. 228/194
3,530,568  9/1970  Owczarski et al. ................. 228/194
3,649,502  3/1972  Herte et al. ...................... 204/192 R
4,166,783  9/1979  Turner ............................. 204/192 R
4,166,784  9/1979  Chapin et al. .................... 204/192 R
4,204,942  5/1980  Chahroudi ....................... 204/192 R

FOREIGN PATENT DOCUMENTS 48-29984  9/1973  Japan .
52-15460  2/1976  Japan .
55-133893  10/1980  Japan .
57-202966  4/1982  Japan .............................. 228/263.17

OTHER PUBLICATIONS

Komatsu et al "Investigation of Heat Treatment in the Liquid-Phase Diffusion Bonding of IN738LC," *Report by the Japanese Association of Metal,* Mar. 20, 1981.
ASME, Repair of Turbine Blades and Vanes, Apr. 8–12, 1973, p. 13, D. S. Duvall and J. R. Doyle.
Welding Journal, Metglas Brazing Foil, Jul. 1978, pp. 33–38, by N. Cristofaro and C. Henschel.

Primary Examiner—M. Jordan
Attorney, Agent, or Firm—Schwartz, Jeffery, Schwaab, Mack, Blumenthal & Evans

[57] ABSTRACT

There is disclosed a method of joining Ni-base heat-resisting alloys which comprises forming, under an inert atmosphere, an aluminum layer on at least surfaces to be joined of a constructional member which has been divided into a plural number of parts composed of a Ni-base heat-resisting alloy reinforced by a $\gamma'$ phase in $Ni_3Al$ system, followed by heating the parts so that said aluminum is dispersed in said Ni-base heat-resisting alloys, the joining portion (joint) contains substantially no $\beta$-NiAl phase and a $\gamma'$-$Ni_3Al$ phase is dispersed therein to join the parts. The joint provided by the method according to the present invention has been improved in its strength and corrosion resistance at a high temperature. Further, the method according to the present invention can be carried out with a high degree of freedom in supplying a joining filler metal.

5 Claims, 5 Drawing Figures

Temperature of melted Aℓ

METHOD OF JOINING NI-BASE HEAT RESISTING ALLOYS

This application is a continuation of application Ser. No. 386,031, filed June 7, 1982.

BACKGROUND OF THE INVENTION

The present invention relates to a method of joining Ni-base heat-resisting alloys which method is suitable for fabricating such parts being made of Ni-base heat-resisting alloys and having complex shapes as those for a heat engine, e.g., high temperature turbine blades.

Usually, Ni-base heat-resisting alloys have been employed as a material for high temperature gas turbine blades, the inner structure of which has a cooling system comprising complicated cooling paths in order to raise the operating temperature.

As the typical structures, there may be mentioned (A) a return-flow type precision cast blade and (B) a wafer blade in which ten and several or more pieces of wafer are joined in layers.

In cases where a high temperature gas turbine equipped with such complicated cooling paths is to be fabricated, the diffusion-joining method is an important technology. Namely, in case of (A), as shown cross-sectionally in FIG. 1, after each half of the blade which has been divided into two parts is precision cast and then these parts are combined together by placing an insert filler metal at the curved surfaces to be joined, the parts are integrated through the diffusion-joining process.

In order to join such broad surfaces with curvature, thicker filler metal is desirable from the standpoint of the dimensional tolerance required.

Further, in case of (B), thinner filler metal is desirable because there are many surfaces to be joined and besides high dimensional accuracy of each plane is required.

Although a high-temperature isobaric compression technique may be employed as another diffusion-joining method to join curved surfaces, this technique requires a special large-sized press as well as a capsulating and a masking technique, and therefore it is intricate and expensive. Consequently, its practicality is problematic.

For the manufacture of blades (A) and (B), a liquid phase diffusion-joining method is normally used to assure the reliability of the joining. That is, the filler metals such as Ni-P, Ni-Si, Ni-Cr-B and so forth have been heretofore used to join Ni-base heat-resisting alloys. In short, such a filler metal, which has been prepared by adding to nickel a melting point-lowering element such as boron, phosphorus or silicon, is melted at a temperature lower, by several tens of degrees, than the melting point of the Ni-base heat-resisting alloy material used as the body material to momentarily wet and braze the Ni-base heat-resisting alloy material, and then a heat treatment is carried out for a long period of time so that the boron, phosphorus or silicon may diffuse, whereby an isothermic solidification of the filler metal as well as the body material is caused, and a strongly joining state is resultingly obtained (Japanese Provisional Patent Publication No. 13060/1974).

However, while this conventional method gives an excellent reliability of the joining, there are, on the other hand, two problems as follows.

First, there is a possibility that B and P, which are melting temperature lowering elements, are contained in the joining portion (joint) to impair its corrosion resistance at higher temperatures and its ductility at higher temperatures. This fact shows that the conventional method is not necessarily sufficient as a method of joining structural parts made of the same Ni-base heat-resisting alloy which is used under severe operating conditions at higher temperature.

The second point is the problem that the method of supplying the filler metal is restricted. The filler metal contains a melting temperature lowering element so that its workability is extremely impaired. Therefore, there has been employed a sheet made of powder using an organic binder, or an amorphous ribbon prepared by the rapid-cooling method.

However, in case of the former, the handling of the sheet is unstable, and there are problems of the contamination by the residue of the binder and of the dimensional shrinkage at the time of melting the sheet. In the latter case, a thickness of only several ten microns can be attained. Thus, the degree of freedom in thickness of the filler metal ranging between thin type and thick type necessary for preparing turbine blades of (A) and (B), can not be obtained.

Further, a plating method and a vapor deposition method have been proposed for the purpose (see Japanese Patent Publication No. 29984/1975). In the former method, however, the composition of the filler is limited to Ni-P and the like, and there is caused a problem of the surface contamination inherent in the wet plating technique. In the latter method, there are problems of the fluctuation and ununiformity of the composition in the deposited material. Thus, there has not been developed any method which has practically high degree of freedom in supplying the filler metal.

SUMMARY OF THE INVENTION

An object of the present invention, in view of the abovementioned points, is to provide a method for together joining parts made of a Ni-base heat-resisting alloy by which there are obtained an improved strength and corrosion resistance at a high temperature of the joint as well as a high degree of freedom in supplying a joining filler metal.

DETAILED DESCRIPTION OF PREFERRED EMBODIMENTS

A fundamental feature of the present invention resides in that an aluminum layer which corresponds to the filler metal is formed on at least the joining surfaces of a constructional member of the same kind of alloys which has been divided into a plural number of parts composed of a Ni-base heat-resisting alloy reinforced by a $\gamma'$ phase in $Ni_3Al$ system, followed by heating the parts so that said aluminum acts as the filler for the liquid phase diffusion-joining to react with the Ni-base heat-resisting alloy and to join the parts, and thereafter the joint has the $\gamma'$-$Ni_3Al$ phase dispersed therein.

As to the material to be joined in the present invention, the present invention can be applied also to a Ni-alloy containing no $\gamma'$ phase therein, but the present invention has a marked effect when it is applied to a Ni-base heat-resisting alloy containing aluminum or a mixture of aluminum and titanium in such an amount as to promote the precipitation of the $\gamma'$ phase. The method according to the present invention in which aluminum is used as a filler metal utilizes the fact that the melted aluminum is involved in a specific rapid alloy reaction with a solid Ni alloy, and thus is a liquid phase diffusion method which is based on a mechanism different from the isothermal solidifying phenomenon caused by a wetting reaction of Ni-alloys.

As a method for supplying aluminium, the use of an aluminum foil is naturally taken into account. For instance, Japanese Provisional Patent Publication No. 133893/1980 has described a specific example in which 27% by weight or less of aluminum is contained near the joint. In fact, aluminium foil could be inserted as a filler metal in case when the strength level at the joined portion is considered not to be so important. When an aluminium foil is used as a filler metal, some deterioration of the properties is caused at the joint due to the inevitable existence of an oxide on the aluminum foil. It is an object of the present invention to provide a joining method which can be applied in the case when joining strength is considered to be important.

As a specific method for the purpose, there may be mentioned a method in which aluminum is deposited under reduced pressure. Alternatively, other PVD method such as the sputtering method or the ion-plating method and CVD method may also be applied for the purpose.

Among these methods, the so-called sputtering method is preferred in which sputtering is carried out in such an inert gas as argon by using an aluminum filler film as an anode and the pieces to be joined as a cathode to first clean-up the surface of the aluminum filler film and then to deposit an aluminum layer on the surfaces of the pieces to be joined.

As one embodiment of this method, the following process can be employed. Ar gas is introduced into the vacuum chamber evacuated at the vacuum level of not lower than $10^{-5}$ Torr, preferably not lower than $10^{-6}$ Torr, and glow discharge is generated by increasing voltage between Al filler film as an anode and the pieces to be joined as a cathode, sputtering Al filler film and cleaning up by eliminating the oxide film formed on the surface. Sputtered Al with strong deposit strength is accumulated (deposited) onto the surface of the pieces to be joined.

It should be hereby noted that it is possible to prevent for the contaminant to deposit at the joint, which is a product at an early stage of sputtering, by setting some device such as a shutter in front of the joint at an early stage of sputtering.

A method, in which an aluminum filler metal and the vacuum vapor deposition are combined, exhibits the quadruple mutual effects as follows: First, the film formation rate is high. Second, there is no heterogeneity of the chemical compositions because of a single element. Third, the thickness of the filler metal as needed is obtainable ranging from several microns or less to several hundreds of microns. Fourth, there is no contamination problem at the joint due to oxidation.

As mentioned above, after Al is provided onto the joint of the pieces to be joined, the pieces are heated, resulting in liquified Al filler by melting Al layer. The heating temperature at which the Al filler is liquified ranges from 660° to 1300° C., preferably from 900° to 1100° C. This liquified Al filler brazes by completely wetting the joining surface of the constructional parts, thereby securing the subsequent joining. Furthermore, Al diffuses into Ni-base heat-resisting alloys as constructional parts by heating long time, resulting in the microstructure strengthened by $\gamma$-Ni$_3$Al phase dispersion finally at the joint by way of the phase change, ($\beta$-NiAl phase)→($\gamma'$-Ni$_3$Al phase)→(Ni$_3$Al+$\gamma$ phase), giving the temperature characteristics which the present invention aims at. Further, the preferred Al content at the joint is not more than 13% by weight for the target aforementioned. It is more preferable to adjust the Al content at the joint at not more than 10% by weight.

The temperature for the liquid phase diffusion-joining treatment is in the range of 700° to 1250° C., preferably of 1000° to 1200° C. The time required therefor is between one minute to 200 hours, preferably between one minute to 50 hours.

In particular, when the strength at an elevated temperature is required at the joint, the amount of the residual $\beta$-NiAl phase should strictly be suppressed, although it may be effective for the corrosion resistance.

The thickness of the aluminum layer varies depending upon the pieces to be joined. However, it may usually be between 0.1 and 200 $\mu$m, preferably between 1 and 50 $\mu$m.

The effects of the process according to the present invention will be enumerated below.

(1) The aluminium layer gives a highly reliable joining which is characteristics of the liquid phase diffusion-joining method.

(2) Because of the absence of B, P and the like which are melting point lowering elements, there is no problem concerning corrosion resistance at higher temperature and deterioration. Rather, the enhancement of the strength at higher temperatures and the improvement of anti-oxidizability are expected because of the formation of $\gamma'$ phase due to the enrichment of the aluminum used for the joining.

(3) Since the filler is supplied by the aluminum vapor deposition method, there is not caused any oxidative contamination of the filler metal per se; the degree of freedom in thickness is large; and there is no problem or fluctuation in the composition.

(4) The aluminum film vapor deposited at a portion other than the joining portion is converted into a phase by the diffusion treatment, which brings about the improvement of the corrosion resistance at higher temperatures which is similar to that obtained by the aluminization treatment.

(5) The properties at an elevated temperature of the joint can be controlled by appropriately selecting the conditions for the heating at a high temperature.

BRIEF DESCRIPTION OF THE DRAWING

The drawings attached hereto will be explained briefly as follows.

Next, the present invention will be explained in more detail, with the attached drawings being referred to, by way of the Examples and the Comparative examples shown below, which however should not be construed to limit the present invention.

DESCRIPTION OF THE PREFERRED EMBODIMENT

Example 1

In order to show the effectiveness of the present invention, a diffusion-joining experiment was carried out using simple model specimens with a middle thickness Al filler.

Figure 1:
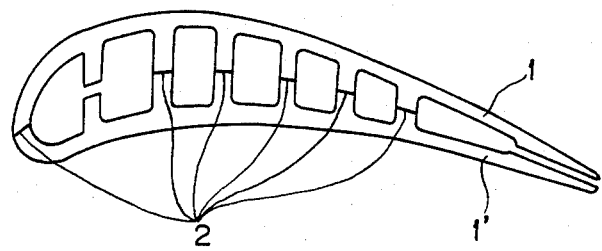
FIG. 1 is a cross-sectional view of a constructional example of a return-flow type built-up turbine blade, to which the process according to the present invention is to be applied.

Two pieces of IN 738 LC cast alloy having a diameter of 20 mm and a thickness of 2 mm (composed of 15.9% of Cr, 1.65% of Mo, 8.21% of Co, 2.46% of W, 3.41% of Ti, 3.62% of Al, 0.86% of Nb, 0.03% of Zr, 0.010% of B, 0.13% of Fe, 1.71% of Ta, 0.09% of C and Balance Ni) were prepared as the constructional parts (indicated as 1 and 1' in FIG. 1) and the joining surfaces 2 of the parts were degreased and rinsed off subsequent to polishing with a #1000 emery paper.

Figure 2:
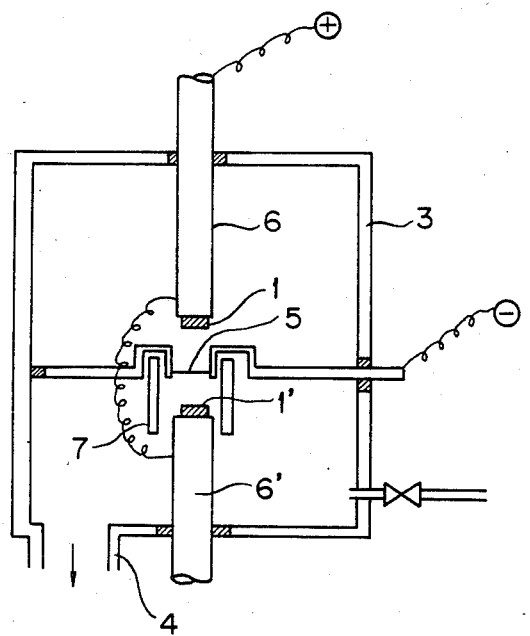
FIG. 2 is a general conceptional view of an apparatus by which the process according to the present invention is to be carried out.

These were set in the vacuum chamber 3 as depicted in FIG. 2. After the vacuum chamber 3 was evacuated from the exhaust vent 4 at a vacuum level of $5 \times 10^{-6}$ Torr, Ar gas was introduced into the chamber, keeping the pressure level not higher than $10^{-3}$ Torr. Subsequently, a potential of 2 KV was applied between the previously polished and cleaned Al filler 5 with 40 $\mu$m thickness as a cathode and the pieces to be joined 1 and 1' as anodes and then the surface of the filler was sputtered for about 10 minutes, thereby cleaning the surface of the Al filler 5. Further, it is preferred to prevent for contaminants on the surface of Al filler to contaminate the surface of the pieces to be joined by pre-setting some device like shutter (not shown in FIG.) near the pieces in this cleaning process. Next, after the shutter was removed as required, a potential of 2 KV was applied to sputter for about 30 minutes, forming Al layers with about 10 $\mu$m thickness on the surfaces 2 of the pieces 1 and 1'. After that, the vacuum chamber 3 was evacuated at a vacuum level of about $5 \times 10^{-6}$ Torr and hot-press was carried out.

Subsequently, about one atmospheric pressure was applied to the parts in between the top and bottom dies 6 and 6' and then they were heated up to 1100° C. within two minutes by the high frequency heating coil 7, held 15 minutes followed by cooling to obtain a highly sound brazing state.

Figure 5:
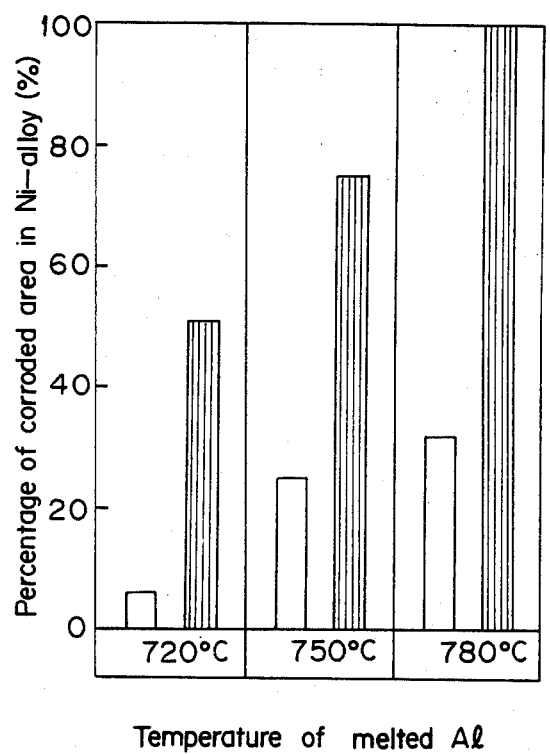
FIG. 5 is a graph showing the result of the corrosion tests conducted on the joined pieces of a solid Ni-alloy at different temperatures.

In order to ascertain the brazeability of Ni alloys by molten Al, the interfacial reaction between Ni alloys and Al was investigated by immersing a thin rod of IN 738 LC of 0.5 mm in diameter in a molten Al bath, of which results are given in FIG. 5. In FIG. 5, the blank boxes show the data when the immersion was made for one minute and the striped boxes show the data when the immersion was conducted for 5 minutes. It is evident from this figure that molten Al well reacts with Ni alloys. Moreover, it was also confirmed by this experiment that the portion where the rod specimen contact with air reacted extremely slowly with molten Al due to the oxide film which has been formed on the rod specimen surface. In addition, it was also convinced by the similar experiment using Fe-base alloys that Fe-base alloys did not react well with molten Al without flux.

For comparison, another test pieces were brazed in the same manner as in Example 1 except that an Al foil having a thickness of 40 $\mu$m was used as an Al filler.

The thus obtained two sets of brazed test pieces were subjected to heat treatment at 1150° C. for 15 hours to cause the diffusion, and then the structures of the cross sections of the joined test pieces were examined. The Al concentrations at the joints of the two sets of the test pieces were about 3.7% by weight.

In the test pieces brazed and joined with the Al foil (Comparative example), it was found that the diffusion was incomplete due to the thickness of the Al foil so that $\beta$-NiAl phase remaining at the central portion of the joint, and oxides were interspersed at the diffusion portion, although the joining itself was successful.

In contrast thereto, in the test pieces joined according to the method of the present invention, the diffusion was completed sufficiently so that the $\beta$-NiAl phase almost disappeared and the joining mark could scarcely be observed at the joint. The electron-microscopic investigation of the structure at the joint revealed that some $\gamma'$ phase layers had been precipitated by the aging treatment.

For another comparison, a liquid phase diffusion-joining was conducted by using an amorphous filler metal composed of 15% of Cr, 4% of B and balance Ni and having a thickness of 40 $\mu$m, which is a typical filler metal in the art.

In order to examine the effect of the filler metal on the hot corrosion, an accelerated hot corrosion test was conducted by coating the brazed portion of the test pieces with a synthetic ash composed of 20% of $Na_2SO_4$ and 80% of $V_2O_5$ and heating the thus coated test pieces at 900° C. for 3 hours, with respect to the test pieces just brazed but not subjected to diffusion treatment.

According to an investigation of the cross-sectional structure of the joint, it was revealed that the joint containing B had suffered from considerable damage by the hot corrosion.

In contrast thereto, the brazed test pieces according to the present invention showed no problem of such damage.

Example 2

In order to achieve higher performance of a gas turbine blade having a cooling system therein, (B) type structure previously mentioned which is characterized by many wafers photoetched, is desirable, where thick filler metal can not be used effectively because of many portions to be joined. Thus, the possibility to join by the thin filler of the present invention was experimented for confirmation. Three pieces of similar test piece as in Example 1, each having 1 mm thickness, were prepared. Then, polishing, degreasing and vapor deposition by sputtering an aluminium layer were conducted in the same manner as in Example 1 to form an aluminium layer having a thickness of about 2 $\mu$m on the surfaces of the test pieces to be joined. Subsequently, these test pieces were superimposed and brazed with each other to attain an excellent brazing over almost all of the joining surfaces, and uniform joints were obtained by the subsequent diffusion treatment.

Example 3

In order to demonstrate the effectiveness of the present invention, a diffusion-joining experiment was conducted using simple model specimens with a middle thickness filler.

Figure 3:
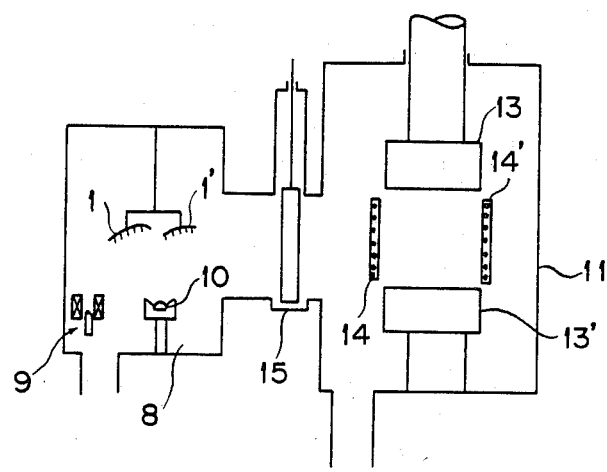
FIG. 3 is a general conceptional view of an example of an apparatus in which the aluminum deposition is now being carried out according to the process of the present invention.
Figure 4:
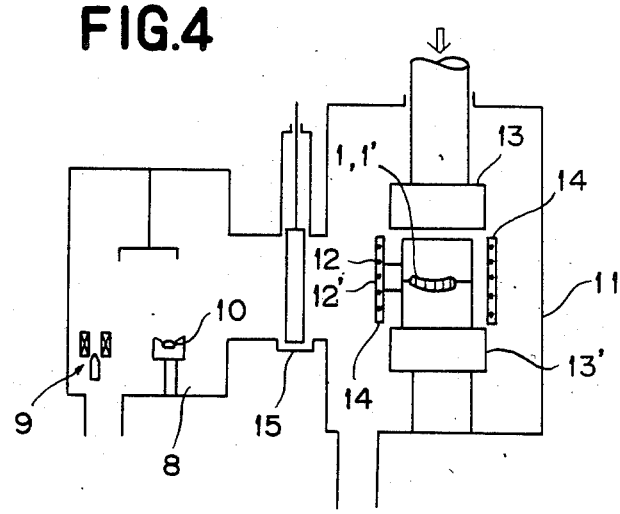
FIG. 4 is a general conceptional view of an example of an apparatus in which the liquid phase diffusion is now being carried out according to the process of the present invention.

Two pieces of IN 738 LC cast alloy having a diameter of 20 mm and a thickness of 2 mm (composed of 15.9% of Cr, 1.65% of Mo, 8.21% of Co, 2.46% of W, 3.41% of Ti, 3.62% of Al, 0.86% of Nb, 0.03% of Zr, 0.010% of B, 0.13% of Fe, 1.71% of Ta, 0.09% of C and Balance Ni) were prepared as constructional parts (shown as 1 and 1' in FIG. 3). Then, the joining surfaces of the parts were degreased and rinsed off subsequent to polishing with a #1000 emery paper. The thus treated parts were set in the chamber 8 as in FIG. 3. After the vacuum chamber was evacuated at a vacuum level of $5 \times 10^{-6}$ Torr, an aluminum having a purity of 99.99% was deposited on the joining surfaces of the constructional parts by using an EB gun 9 for vapor deposition of the aluminum 10. The thickness of the Al layers deposited was estimated to be about 10 $\mu$m from the amount of the Al charged. Subsequently, the parts were transferred from the first vacuum chamber 8 to the second vacuum chamber 11 evacuated in advance at a vacuum level of $5 \times 10^{-6}$ Torr, and set at the hot press portion as shown in FIG. 4.

Then, a pressure of 10 kg/cm² was applied, though the loading members 13 and 13', to the parts inbetween the top and bottom dies 12 and 12', and the parts were heated up to 1100° C. within 2 minutes by using the high-frequency heating coils 14 and 14' and maintained as such for 15 minutes followed by cooling.

As the result, it was found that the state of the brazing was very good.

The numeral 15 indicates the separator which separates the first vacuum chamber 8 and the second vacuum chamber 11.

Although the above explanation was made with respect to a gas turbine blade having a cooling system therein, the present invention can also be applied to the tandem joining between gas turbine blades, insert joining, Ni-alloy joining in a combustor and so on.

We claim:

1. A method for joining at least two parts which present facing surfaces, said parts comprising a constructional member which is comprised of a Ni-base heat-resisting alloy, comprising the steps of:
   (a) forming, by deposition under reduced pressure, a layer consisting essentially of aluminum on at least said facing surfaces of said parts to be joined, wherein said deposition is effected by means of a sputtering method that uses an aluminum filler film separating said parts as an anode and said constructional member as cathode;
   (b) bringing said facing surfaces of said parts into contact with each other;
   (c) subjecting said parts to a first heating, such that said layer is liquified; and thereafter
   (d) subjecting said parts to a second heating, such that aluminum from said layer diffuses into said Ni-base heat-resisting alloy to form a joint between said parts comprising a $\gamma$-Ni$_3$Al phase dispersion, said joint containing substantially no $\beta$-NiAl phase.

2. A method as claimed in claim 4, wherein said heating step is carried out at a temperature of about 700° to 1250° C. for one minute to 200 hours.

3. A method as claimed in claim 2, wherein said heating step is carried out at a temperature of about 1000° to 1200° C. for one minute to 50 hours.

4. A method of as claimed in claim 1, wherein said constructional member is a constructional member for the airfoil of a turbine.

5. A method as claimed in claim 1, wherein step (b) comprises bringing said facing surfaces into contact under an applied pressure of up to about 10 kg/cm².

* * * * *